(12) United States Patent
Jonsson

(10) Patent No.: US 8,121,231 B2
(45) Date of Patent: Feb. 21, 2012

(54) METHOD AND DEVICE FOR CHANNEL RESPONSE DETERMINATION

(75) Inventor: Elias Jonsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 800 days.

(21) Appl. No.: 12/278,379

(22) PCT Filed: Feb. 8, 2007

(86) PCT No.: PCT/EP2007/051222
§ 371 (c)(1),
(2), (4) Date: Sep. 29, 2008

(87) PCT Pub. No.: WO2007/090868
PCT Pub. Date: Aug. 16, 2007

(65) Prior Publication Data
US 2009/0245338 A1 Oct. 1, 2009

Related U.S. Application Data

(60) Provisional application No. 60/771,855, filed on Feb. 10, 2006.

(30) Foreign Application Priority Data

Feb. 10, 2006 (EP) .................................. 06101517

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/260; 375/232; 375/334; 375/341; 375/349

(58) Field of Classification Search .................. 375/346, 375/260, 232, 343, 341, 349
See application file for complete search history.

(56) References Cited

U.S. PATENT DOCUMENTS

| 5,353,307 | A | 10/1994 | Lester et al. | |
| 6,507,602 | B1 | 1/2003 | Dent | |
| 7,139,336 | B2* | 11/2006 | Nefedov | 375/341 |
| 7,623,596 | B2* | 11/2009 | Krasny et al. | 375/340 |
| 2004/0264603 | A1* | 12/2004 | Krasny et al. | 375/340 |
| 2005/0058194 | A1* | 3/2005 | Yousef | 375/232 |
| 2005/0123075 | A1* | 6/2005 | Kim et al. | 375/340 |
| 2005/0152482 | A1 | 7/2005 | Tubbax et al. | |
| 2007/0160159 | A1* | 7/2007 | Song et al. | 375/260 |
| 2009/0274252 | A1* | 11/2009 | Ghosh | 375/346 |
| 2010/0014617 | A1* | 1/2010 | Koo et al. | 375/343 |

OTHER PUBLICATIONS

Komulainen, P. et al: "Adaptive filtering for fading channel estimation in WCDMA downlink" 11th IEEE International Symposium on Personal, Indoor and Mobile Radio Communications, Sep. 18-21, 2000, Piscataway, NJ, USA. IEEE, vol. 1, pp. 549-553, XP010520697, ISBN: 0-7803-6463-5. PCT International Search Report, mailed May 16, 2007, in connection with International Application No. PCT/EP2007/051222.
PCT Written Opinion, mailed May 16, 2007, in connection with International Application No. PCT/EP2007/051222.
PCT International Preliminary Report on Patentability, mailed Apr. 21, 2008, in connection with International Application No. PCT/EP2007/051222.

* cited by examiner

*Primary Examiner* — Phuong Phu
(74) *Attorney, Agent, or Firm* — Potomac Patent Group PLLC

(57) ABSTRACT

A method and a device for channel response determination for a wireless communication system. The method comprises generating a first vector of channel responses from channel estimations obtained by using a training signal. A second vector of regularized channel responses is generated by applying to the first vector a regularization algorithm. The algorithm is operative such that a second difference between consecutive regularized channel responses of the second vector is less than a first difference between consecutive channel responses of the first vector.

28 Claims, 4 Drawing Sheets

METHOD AND DEVICE FOR CHANNEL RESPONSE DETERMINATION

TECHNICAL FIELD OF THE INVENTION

The present invention relates to a method and device for channel response determination for a wireless communication system operating over a plurality of channels.

DESCRIPTION OF RELATED ART

Orthogonal Frequency Division Multiplexing (OFDM) is a communication technique using multiple channels having different frequencies (also referred to as tones) for communicating OFDM symbols. The OFDM symbol comprises a plurality of complex symbols representing a sequence of information bits. Each complex symbol, $s_n$, of an OFDM symbol is communicated over a separate frequency channel.

In an OFDM transmitter, a stream of complex symbols representing a coded and modulated sequence of information bits may be denoted s. An OFDM symbol comprises N such complex symbols, that is, $s_n$, $n=1, \ldots, N$. Before transmission, the OFDM symbol is Inverse Fast Fourier Transformed (IFFT) in an IFFT block of the OFDM transmitter. The output of the IFFT block may be denoted $\hat{s}_n$, $n=1, \ldots, N$, where $$\hat{s}_n = \frac{1}{\sqrt{N}} \sum_{m=1}^{N} s_m e^{j\frac{2\pi nm}{N}}$$

$$\hat{s}_n = \frac{1}{\sqrt{N}} \sum_{m=1}^{N} s_m e^{j\frac{2\pi nm}{N}}.$$

This can be interpreted in such a way that the complex symbol $s_n$ is mapped to frequency n or tone n. There are a total of N orthogonal tones, and thus N channels. The stream of IFFT symbols $\hat{s}_n$ can be extended with a copy of the last sent P complex symbols $\hat{s}^{CP}_P$ added before the actual signal $\hat{s}^{actual}_n$ at the beginning of the sequence. The P extra complex symbols are called a cyclic prefix (CP). If the output from a CP adder, after the $\hat{s}^{CP}_P$ has been added to $\hat{s}^{actual}_n$, is denoted $\tilde{s}_n$, $n=1, \ldots, N+P$, then:

$$\tilde{s}_n = \hat{s}^{CP}_{N-P+n}, n=1, \ldots, P,$$

$$\tilde{s}_n = \hat{s}^{actual}_{n-P}, n=P+1, \ldots, N+P,$$

are provided. Here the first symbol to be transmitted will be $\tilde{s}_1$, then $\tilde{s}_2$, and so on.

A pulse-shaping block may be provided to apply pulse-shaping before transmission in order to decrease frequency leakage. If p(t) is a continuous time representation of a pulse-shaping filter, the output of the pulse-shaping block may be represented by:

$$s(t) = \sum_{m=-\infty}^{\infty} \tilde{s}_m p(t - mT_s/(N+P)), \quad (1)$$

where $T_s$ is the length in seconds of the OFDM symbol and t is a continuous time variable. The variable s(t) may be sent over the air after power amplification.

In an OFDM receiver, the received sampled signal y can be modeled as:

$$y_n = \sum_{\iota=1}^{\tilde{L}} \tilde{h}_\iota s(t_n - \tau_\iota) + \eta_n, \quad (2)$$

where $\tilde{h}$ is the propagation channel response, $\tilde{L}$ is the number of channels having a significant contribution, $t_n$ is the sampling time, $t_n = n \cdot T_s/(N+P)$, and $\tau_\iota$ is the time delay of the propagation channel path indexed as $\iota$. The inter-cell interference and thermal noise is modeled as AWGN (Additive White Gaussian Noise) and denoted $\eta_n$.

Substitution of equation (1) into equation (2) provides:

$$y_n = \sum_{\iota=1}^{\tilde{L}} \tilde{h}_\iota \sum_{m=-\infty}^{\infty} \tilde{s}_m p((n-m)T_s/(N+P) - \tau_\iota) + \eta_n$$

$$= \sum_{\iota=1}^{\tilde{L}} \tilde{h}_\iota \sum_{m=-\infty}^{\infty} \tilde{s}_{n-m} p(mT_s/(N+P) - \tau_\iota) + \eta_n$$

$$= \sum_{m=-\infty}^{\infty} \tilde{s}_{n-m} h_m + \eta_n,$$

where $$h_m = \sum_{\iota=1}^{\tilde{L}} \tilde{h}_\iota p(mT_s/(N+P) - \tau_\iota).$$

Due to the applied pulse-shaping, only a few of the terms $h_m$ will add significantly to the sum. To simplify the analysis, let $h_m$, $m=1, \ldots, L$ be the significant terms. Then, $$y_n = \sum_{m=1}^{L} \tilde{s}_{n-m} h_m + \eta_n.$$

The cyclic prefix CP may be removed in a block provided therefore. Since the cyclic prefix is found in the beginning of the OFDM symbol, only $y_n$ for $n=P+1, \ldots, N+P$ are kept.

The length of the cyclic prefix in time is usually selected to be larger than the propagation channel time delay. In this case, the inter-symbol interference caused by the propagation channel among the samples $y_n$, $n=P+1, \ldots, N+P$ is solely restricted to the originally sent actual symbols $\hat{s}^{actual}_n$, $n=1, \ldots, N$, when P is larger than L.

Put more mathematically, the sent OFDM symbol is cyclically convolved with the propagation channel. It can be shown that the Fourier transform of a cyclic convolution equals the product of the Fourier transform of the constituent factors, that is, the FFT of $y_n$ equals $$Y_n = H_n s_n + \hat{\eta}_n,$$

where $$H_n = \frac{1}{\sqrt{N}} \sum_{m=1}^{L} h_m e^{-j\frac{2\pi nm}{N}},$$

$$Y_n = \frac{1}{\sqrt{N}} \sum_{m=1}^{N} y_{m+P} e^{-j\frac{2\pi nm}{N}},$$

$$\hat{\eta}_n = \frac{1}{\sqrt{N}} \sum_{m=1}^{N} \eta_{m+P} e^{-j\frac{2\pi nm}{N}}.$$

Observe that the Fourier transform of an AWGN process still has the property of an AWGN, therefore $\hat{\eta}_n$ is still AWGN. The output of an FFT block will be $Y_n$, $n=1, \ldots, N$.

A channel response estimation block may be provided to estimate $H_n$. A known symbol, a pilot symbol, may be transmitted within an OFDM symbol. Assume that $(s^{pilot}_n)$ is a pilot symbol that is known to the OFDM receiver. Then, $\hat{H}^{est}_n$ may be estimated as:

$$\hat{H}^{est}_n = Y_n (s^{pilot}_n)^*$$

where the notation $(s^{pilot}_n)^*$ refers to the complex conjugate of the known pilot signal. If the propagation channel response is substantially constant for the duration of a number of pilot symbols, the channel estimates $\hat{H}^{est}_n$ may be time filtered based on the currently generated and previously generated channel estimates for a certain channel, that is, filtering in the time domain may be provided. The amount of filtering depends on the variation of the propagation channel response, i.e. how fast the propagation channel changes. The variation of the propagation channel response may be estimated by, e.g., a Doppler estimator.

Once channel response estimates, non-filtered $\hat{H}^{est}_n$ or filtered $\hat{H}^{filt}_n$ are calculated, the transmitted data may be demodulated in a demodulation block. The demodulated data may be given by $$(\hat{H}^{est}_n)^* \cdot Y_n \approx s_n,$$

which may be fed to a decoder block for decoding.

Thus, to demodulate the transmitted data, the complex conjugate of the channel response estimates $\hat{H}^{est}_n$ is needed.

The channel response estimate $\hat{H}^{est}_n$ does not fully correspond to the true channel characteristics $H_n$. For example, the channel response estimate $\hat{H}^{est}_n$ is influenced by e.g. Doppler or multi-path effects and noise, which may be caused by inter-cell interference and/or thermal noise. The quality of the channel response estimate $\hat{H}^{est}_n$ affects the quality of the demodulation of the transmitted data.

One possibility to improve the channel response estimate is to time filter it, as described above. This provides filtering in the time domain, which may improve the channel response estimate to some extent.

US 2005/0152482 discloses a method of determining IQ imbalance introduced on an RF multicarrier signal received via a channel on a direct conversion analog receiver. In one embodiment, the method comprises i) receiving a training signal on the receiver, ii) demodulating the training signal on the receiver, iii) estimating a first frequency domain channel characteristic of the channel based on the demodulated training signal, iv) defining a predetermined relationship between a corrected frequency domain channel characteristic of the channel and the first channel characteristic, the predetermined relationship comprising at least one IQ imbalance parameter, and v) determining the at least one IQ imbalance parameter such that the corrected channel characteristic satisfies a channel constraint.

The problems discussed above with regard to OFDM are applicable also to other communication techniques, such as WCDMA (Wideband Code Division Multiple Access), in which samples of a signal are transmitted over channels having varying channel responses.

SUMMARY OF THE INVENTION

In a first aspect, there is provided a method for channel response determination for a wireless communication system operating over a plurality of channels, comprising: generating a first vector of channel samples from channel estimations obtained by using a training signal; generating a second vector of regularized channel responses by applying to the first vector of channel samples a regularization algorithm; wherein a second difference between consecutive regularized channel responses of the second vector is less than a first difference between consecutive channel samples of the first vector.

According to an embodiment, the step of generating a second vector may comprise multiplication of the first vector with a third matrix, which is an inverse of the sum of an identity matrix and a fourth matrix comprising constants, which are operative to decrease the second difference between the consecutive regularized channel responses of the second vector. The third matrix may be precomputed for specific values of the constants.

In another embodiment, the regularization algorithm may comprise a regularization term that may comprise a difference between a first regularized channel response and a second regularized channel response, wherein the second regularized channel response is consecutive of the first channel response within the second vector in a frequency domain. The regularization algorithm may comprise constants that are operative to adjust the amount by which the second differences between consecutive regularized channel responses of the second vector are decreased. The values of the constants may be set in dependence on whether the channel samples of the first vector are based on channel estimates of a single OFDM symbol. The values of the constants may be set larger if the channel samples of the first vector are based on channel estimates of different OFDM symbols than if the channel samples of the first vector are based on channel estimates of a single OFDM symbol.

In a further embodiment, the regularization algorithm may comprise a fitting term that comprises a difference between a specific regularized channel response of the second vector and a corresponding specific channel sample of the first vector. The first vector may comprise a plurality of groups of channel samples, wherein the regularization algorithm is applied to each group of channel samples separately.

In a still further embodiment, the method may further comprise generating a filtered third vector based on the present second vector, at least one previously generated second vector and a filter coefficient.

The wireless communication system may be an orthogonal frequency division multiplexing communication system or a wideband code division multiple access communication system.

The first and second differences may be obtained in the frequency domain. The fourth matrix may be a tri-diagonal matrix of constants. The channel estimations obtained by using a training signal may be filtered in the time domain before being used for generating the first vector of channel samples.

In another aspect, there is provided a channel response determination device for a wireless communication system operating over a plurality of channels for performing the above-mentioned method steps or having the above-mentioned features.

In a further aspect, there is provided a computer program product comprising computer program codes for executing the above-mentioned method steps, when said computer program codes are run by an electronic device having computer capabilities.

In a still further aspect, there is provided a computer readable medium having stored thereon a computer program product comprising computer program codes for executing the above-mentioned method steps, when said computer program codes are run by an electronic device having computer capabilities.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION OF EMBODIMENTS

Below, several embodiments of the invention will be described with references to the drawings. These embodiments are described in illustrating purpose in order to enable a skilled person to carry out the invention and to disclose the best mode. However, such embodiments do not limit the invention. Moreover, other combinations of the different features are possible within the scope of the invention.

A method and a channel response estimator 1 for providing channel response determination for a wireless communication system are disclosed. The communication system may e.g. be an OFDM or a WCDMA (Wideband Code Division Multiple Access) communication system. Each channel response estimate may be an estimate for a specific sub-channel of a propagation channel of the communication system. Below, the expression "channel estimates" is used as a short form for "channel response estimates".

Figure 1:
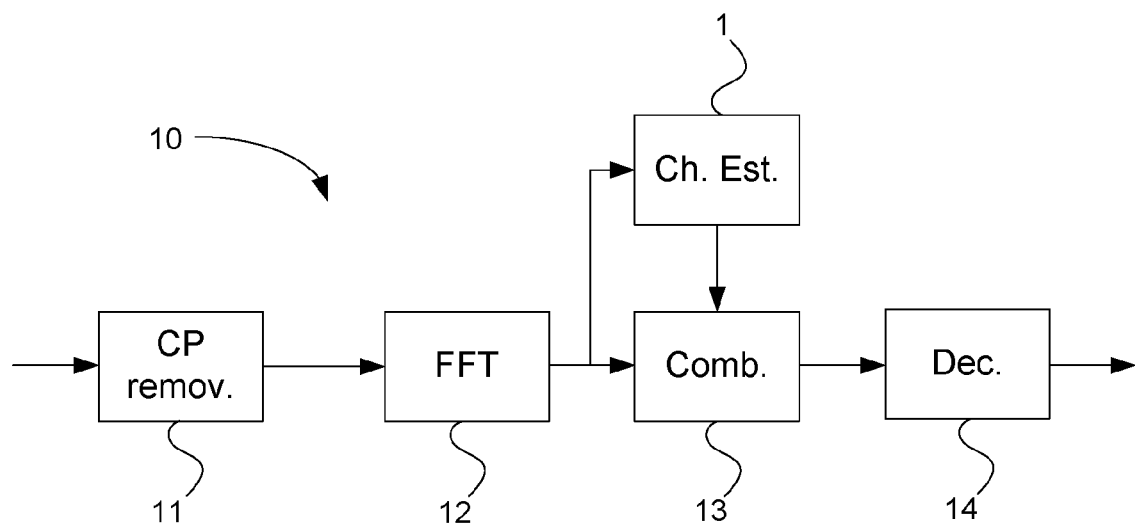
FIG. 1 is a block diagram of an OFDM receiver.

FIG. 1 illustrates an example of an OFDM receiver 10, in which the channel estimator 1 may be implemented. The OFDM receiver comprises a CP remover block 11, an FFT block 12, a combiner block 13, and a decoder block 14 in addition to the channel estimator 1. This is only one embodiment, in which the channel estimator 1 may be utilized, that is not limiting the invention. The channel estimator 1 may be implemented in other configurations of a receiver.

It is considered that a curve connecting the actual responses of the channels, or H, should have a smooth appearance. In the following, the actual responses of the channels will be denoted $H^{true}$, which is a vector comprising n=1, ..., N values, where N is the number of tones or frequency channels of the OFDM system. Having a smooth appearance means that there will be no substantial differences between consecutive responses of $H^{true}$.

The responses of the channels may be estimated by the use of training signals, i.e. channel estimates are generated, in the OFDM receiver 10. Thus, a channel estimation vector $H^{est}$ may be generated in the OFDM receiver based on received pilot symbols. However, due to e.g. interference and noise, a curve connecting the responses of $H^{est}$ in the frequency plane may not be as smooth as the curve connecting the values of $H^{true}$.

The channel estimates, possibly after time filtration, are collected in a vector called $H^{com}$, which comprises channel samples based on channel estimates from pilot signals.

A vector of regularized channel responses, $H^{reg}$, is generated based on the vector $H^{com}$ by applying a regularization algorithm to $H^{com}$. The regularization algorithm is operative to generate $H^{reg}$ based on $H^{com}$. $H^{reg}$ will comprise regularized channel responses. The regularization algorithm is operative to generate $H^{reg}$ by regularizing the channel samples of $H^{com}$ such that the difference between consecutive regularized channel responses of $H^{reg}$ is less than the difference between the channel responses of consecutive channel samples of $H^{com}$.

Thus, each value of $H^{reg}$ is based on a corresponding value of $H^{com}$. The values of $H^{com}$ will either be increased or decreased to generate the corresponding values of $H^{reg}$.

As different values of $H^{reg}$ represent different channels and because the difference between consecutive values of $H^{reg}$ has been decreased, filtering in the frequency domain has been provided. Consequently, a curve connecting the values of $H^{reg}$ is smoother than a curve connecting the values of $H^{com}$. As the curve for $H^{reg}$ is smoother than $H^{com}$, it will have better resemblance with a curve for $H^{true}$. Thus, $H^{reg}$ provides channel estimates with improved quality compared to $H^{com}$, even if $H^{com}$ has been filtered in the time domain.

Figure 2:
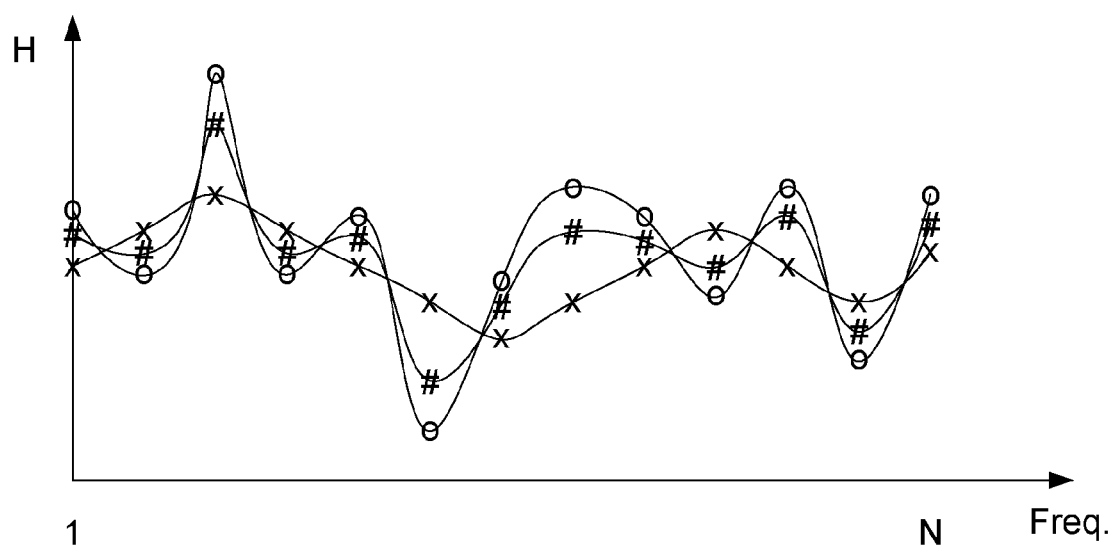
FIG. 2 is a graph illustrating channel estimates.

FIG. 2 illustrates examples of curves connecting values of $H^{true}$, $H^{com}$, and $H^{reg}$ for N channels or tones. The values of $H^{true}$ are denoted by x, the values of $H^{com}$ are denoted by o, and the values of $H^{reg}$ are denoted by #. As can be seen from FIG. 2, the curve for $H^{reg}$ is smoother than the curve for $H^{com}$, i.e. the difference between consecutive values of $H^{reg}$ is less than corresponding consecutive values of $H^{com}$. Furthermore, as can be seen from FIG. 2, the values of $H^{reg}$ are provided between the corresponding values of $H^{true}$ and $H^{com}$. Thus, the values of $H^{reg}$ will have a better resemblance with the values of $H^{true}$. Consequently, the quality of the channel estimates of $H^{reg}$ is better than the quality of the channel estimates of $H^{com}$.

A received sampled signal y may be input to the CP remover block 11. The sampled signal may be modeled as described above. Sampling of a received signal may be provided as is known in the art and is therefore not further disclosed here. The sampled signals may e.g. be temporarily stored in a memory (not shown). The memory may also be used for storing other data, such as constants and coefficients, software instructions, etc., which may be used e.g. by the channel estimator 1.

An estimated channel response for a specific channel may be determined based on received pilot symbol as described above. If no useable estimated channel response is available for a specific tone, a previously generated estimated channel response for that tone may be used as a channel sample for that tone.

Figure 3:
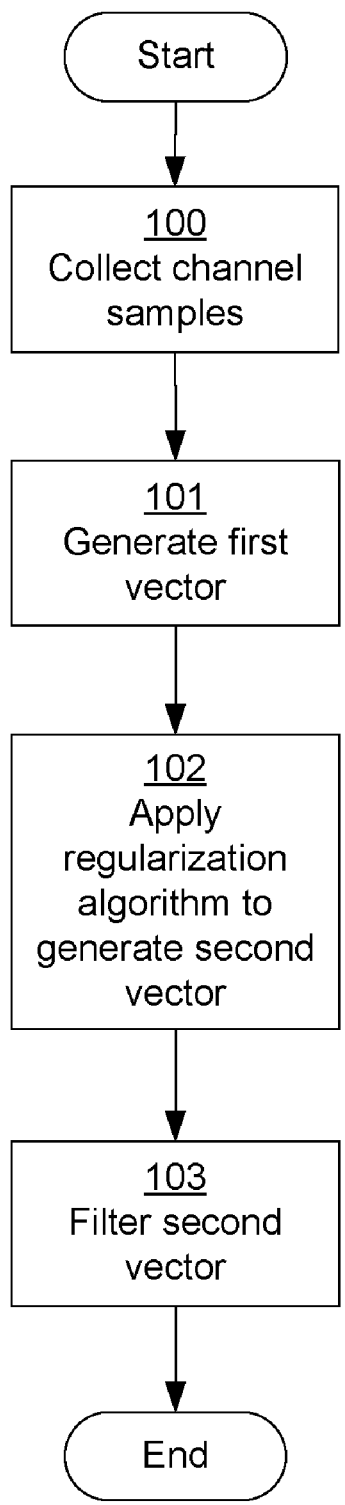
FIG. 3 is a flow-chart of a method according to an embodiment of the invention.

FIG. 3 illustrates an embodiment of the method for providing channel estimates. In a first block 100, a given number of channel samples is collected by the channel estimator 1. The channel samples are composed into a first vector $H^{com}$. The first vector $H^{com}$ comprises unregularized channel samples. $H^{com}$ should be based on channel estimates for which the transmitted data is known.

In some embodiments, a complete OFDM symbol comprises only pilot symbols. In that case, channel estimates for all tones can be collected from a single OFDM symbol. Thus, the channel samples of the first vector $H^{com}$ will be based on channel estimates from a single OFDM symbol. If, on the other hand, an OFDM symbol only contains pilot signals for a few tones of the OFDM symbol, channel estimates for channels comprising pilot symbols are collected for as many OFDM symbols as possible. For the remaining channels, an old channel estimate may be used, especially if the channel response is essentially constant. A Doppler estimator may be used to determine whether the propagation channel stays constant.

In block 101 the first vector $H^{com}$ with channel samples $H_n^{com}$, n=1, ..., N, is generated from previous channel estimates, possibly filtered. A certain channel sample $H_n^{com}$ for a certain tone n is generated based on the corresponding previously generated channel estimate if no new channel estimate is available to take its place. Thus, the value n of $H^{filt}$ is included as value n of $H^{com}$ when no new channel estimate is available for tone n. When a new channel estimate is available for tone n, the value of the new channel estimate of tone n is included in $H^{com}$. Let $H_n^{com,re}$ be the real part of $H_n^{com}$ and $H_n^{com,im}$ be the imaginary part of $H_n^{com}$.

In block 102, a regularization algorithm is applied to the first vector $H^{com}$.

According to embodiments, the real part and the imaginary part of $H^{com}$ may be treated separately. Thus, the channel estimator 1 may be adapted to separate the first vector $H^{com}$ into its real and imaginary parts. In the following embodiment, the channel regularization calculations are separated into the real and imaginary parts. When the real and imaginary parts have been processed separately, they are added to a complex symbol. However, in another embodiment, the real and imaginary parts are processed together.

Let $H_n^{reg,re}$ denote the regularized or de-noised real part of generated regularized channel estimates. Solve for $H_n^{reg,re}$ in $$\min_{H^{reg,re}} \left( \frac{1}{2} \sum_{n=1}^{N} (H_n^{reg,re} - H_n^{com,re})^2 + \frac{1}{2} \sum_{n=1}^{N-1} \alpha_n (H_n^{reg,re} - H_{n+1}^{reg,re})^2 \right) \quad (3)$$

where $H^{reg,re} = (H_1^{reg,re}, \ldots, H_N^{reg,re})^t$. The notation $x^t$ means the transpose of the vector x.

The first term, $(H_n^{reg,re} - H_n^{com,re})^2$, is a fitting term, which is operative to keep the de-noised regularized channel response $H_n^{reg,re}$ as close as possible to the corresponding channel sample $H_n^{com,re}$. The fitting term comprises the difference between a certain regularized channel response of $H_n^{reg,re}$ and the corresponding channel sample of $H_n^{com,re}$.

The second term, $(H_n^{reg,re} - H_{n+1}^{reg,re})^2$, comprises the difference between a first regularized channel response n and a second regularized channel response n+1 of the real part of the second vector $H^{reg,re}$. The second channel estimate is consecutive of the first channel estimate of $H_n^{reg,re}$ in the frequency domain. The second term is a regularization term, which is operative to ensure that the channel response of the regularized second vector $H^{reg}$ evolve smoothly over the tones.

$\alpha_n$ is a constant, which is operative to decrease the difference between the signal levels of consecutive channel estimates of the second vector $H^{reg,re}$, in this case its real part. The values of the constants are operative to adjust the amount by which the fitting term is adjusted.

The larger $\alpha_n$ is, the more a difference in the consecutive regularized channel estimates $H_n^{reg,re}$ and $H_{n+1}^{reg,re}$ is penalized.

In different embodiments, different values of $\alpha_n$ may be used. A smaller value of $\alpha_n$ may be used if channel samples $H_n^{com,re}$ and $H_{n+1}^{com,re}$, which are used to generate the first vector $H^{com}$, are derived from both a new channel estimate and a previously generated channel estimate. In other words, the values of the constants $\alpha_n$ may be larger if the channel samples of $H^{com}$ are based on channel samples for different OFDM symbols than if the channel samples of $H^{com}$ are based on channel samples for a single OFDM symbol. Thus, differences between consecutive values of the first vector $H^{com}$ due to channel responses, which may change between different channel estimations, such as propagation delay and fading, are considered. In the case an OFDM symbol contains only pilots, i.e. $H^{com}$ is based on channel estimates for a single OFDM symbol, the constant $\alpha_n$ may be the same for all n, which provides a design that is easy to implement. In the case $H^{com}$ is based on channel estimates from different OFDM symbols, different values of $\alpha_n$ may be used. The values of $\alpha_n$ may thus be set dependent on whether $H^{com}$ is based on channel estimates from a single OFDM symbol, or whether $H^{com}$ is based on channel estimates from different OFDM symbols. The values of $\alpha_n$ may e.g. be in the range of 0-10.

The regularization term, i.e. the second term, uses in this embodiment the squared difference between $H_n^{reg,re}$ and $H_{n+1}^{reg,re}$, i.e., the L2-norm. However, in other embodiments, other norms may be used, such as the L1-norm, i.e. the absolute value of the difference. The L2-norm allows for simpler calculations. Thus a more efficient implementation may be obtained with the L2-norm. The L1-norm may allow for a channel determination that is closer to the true characteristic of the channel, as the difference is not squared. Thus, the L1-norm may allow for further improvement of the quality of the regularized channel responses of the second vector $H^{reg}$.

In some embodiments, the value of the constants $\alpha_n$ could be made to vary adaptively depending on the delay spread of the channels. The delay spread may be determined by measuring the time difference between the first and the last propagation channel path. The actual values of $\alpha_n$ may be set by the channel estimator 1. A large delay spread would imply a smaller value of $\alpha_n$ compared to a smaller delay spread, and vice versa. Additionally or alternatively, the value of the constants $\alpha_n$ may vary adaptively in dependence of the speed or velocity of the terminal, in which the channel estimator 1 is included.

Solving for $H_n^{reg,re}$ in equation (3) is straightforward, and the solution is given by $$H^{reg,re} = (I+R)^{-1} H^{com,re} \quad (4)$$

where I is an identity matrix, and R is tri-diagonal matrix of constants given by $R_{n,n} = \alpha_{n-1} + \alpha_n$, $n=2, \ldots, N-1$, $R_{1,1} = \alpha_1$, $R_{N,N} = \alpha_{N-1}$, $R_{n,n+1} = -\alpha_n$, $n=1, \ldots, N-1$, $R_{n,n-1} = -\alpha_{n-1}$, $n=2, \ldots, N-1$.

The rest of $R_{n,m}$ being zero.

The matrix R is a matrix of constants, which are operative to decrease the difference between the signal levels of consecutive channel responses of the second vector.

Thus, the regularization algorithm may comprise the inverse of the sum of the identity matrix and the matrix of constants, $(I+R)^{-1}$, which may be solved by any available numerical methods, such as the Gauss-Seidel method. Applying the inverse $(I+R)^{-1}$ to $H^{com,re}$ provides $H^{reg,re}$.

In some embodiments, the entire inverse $(I+R)^{-1}$ is solved for the entire $H^{com,re}$. In other embodiments, to speed up the calculation of the inverse $(I+R)^{-1}$, instead of solving for equation (3), the elements of $H^{com,re}$ are grouped into G groups. Each group thus comprises N/G elements. Then, equation (3) is solved for and applied to each group. Thus, the regularization algorithm is applied to each group separately. The elements in each group represent consecutive tones. Thus, equation (3) has to be solved G times. However, the inverse calculation in (4) will be less computationally intensive for each group, and the overall numerical complexity will be reduced. The number of elements in each group may e.g. be in the range of 8 to 16.

To further speed up the generation of $H^{reg,re}$, the inverse $(I+R)^{-1}$ may be precomputed for a set of different values of the constants $\alpha_n$.

In block 103 the channel estimates of $H^{reg,re}$ may be filtered by the channel estimator 1 also in the time domain. Filtering in the time domain in addition to filtering or de-noising in the frequency domain is not necessary in all embodiments, but may be provided to further improve the quality of the channel estimates of $H^{reg,re}$. Once de-noised channel estimates $H_n^{reg,re}$ are provided, they may be filtered with previously generated channel estimates to get the filtered channel estimates $H_n^{Reg,filt,re}$, which are filtered also in the time domain, that is, $$H_t^{Reg,filt,re} = \lambda(H_t^{reg,re} - H_{t-1}^{Reg,filt,re}) + H_{t-1}^{Reg,filt,re}, \quad (5)$$

where t is a time index. $\lambda$ is a filter coefficient, which may depend on the propagation channel condition. A smaller value of $\lambda$ can be used when the propagation channel stays constant for a longer period of time compared to when the propagation channel stays constant a shorter period of time. The value of $\lambda$ may e.g. be in the range of 0.01-1.

The channel estimator 1 is operative to implement functions to carry out the method as described above. The channel estimator 1 may e.g. be implemented as a hardware unit, such as by an ASIC (Application Specific Integrated Circuit) or an FPGA (Field Programmable Gate Array). Alternatively, the channel estimator 1 and its functions are provided by a processor, such as a CPU (Central Processing Unit) running software therefore. Also, the channel estimator 1 may be provided by a combination of hardware and software.

Figure 4:
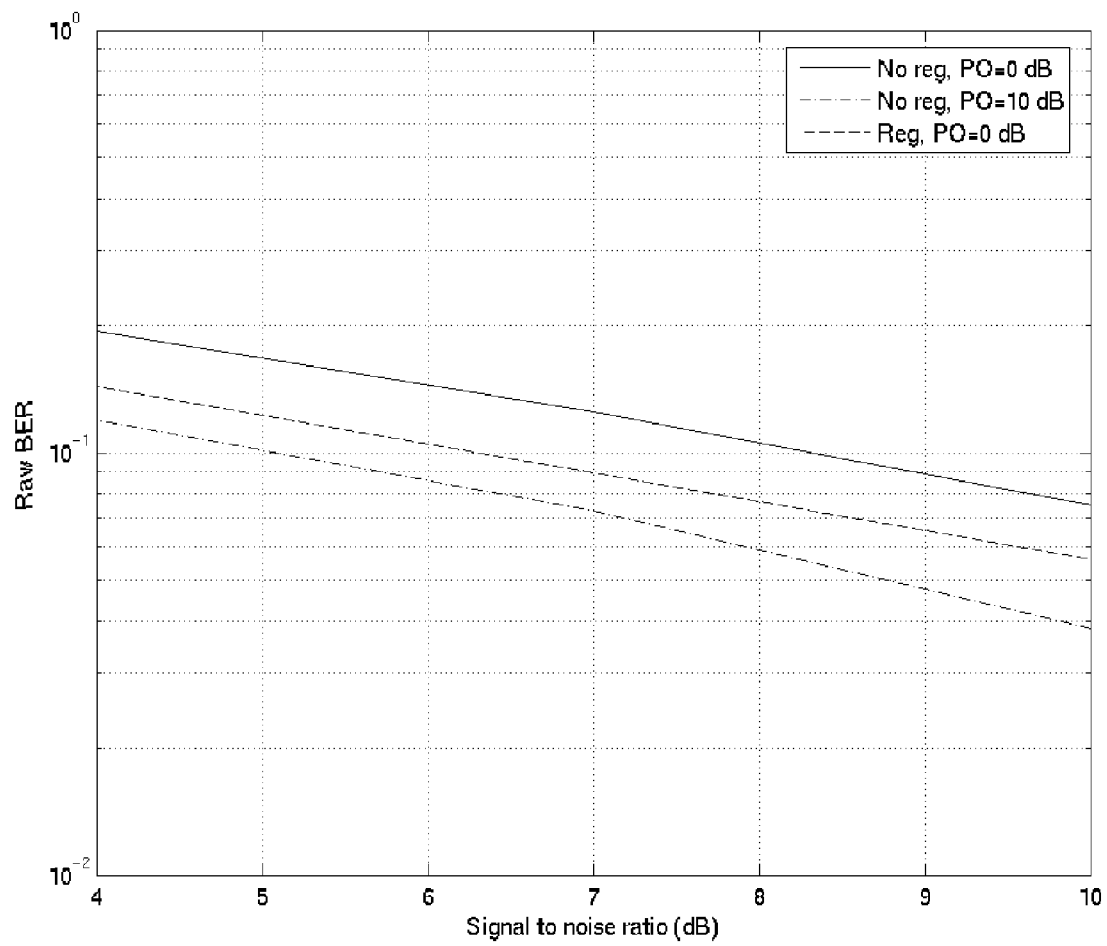
FIG. 4 is a graph illustrating a result of a simulation of an embodiment of the invention.

In FIG. 4, a result of a simulation of one embodiment of the method and channel estimator according to the invention is shown. The propagation channel used was a two-path channel with the paths separated by 3.56 microseconds and the average power of the paths are set to the same value. The speed of the mobile telephone, in which the channel estimator was assumed to be included, was 120 km/h, and 256 tones were used. The length of the cyclic prefix was set to 25 complex symbols. For simplicity, every 10th OFDM symbol was set to be a pilot symbol. The legend saying 'No reg PO=0 dB' means that no regularization was used and the power offset between pilots and data was 0 dB. The legend saying 'No reg PO=10 dB' means that no regularization was used and the power offset between pilots and data was 10 dB, which is a best case scenario, since the Signal to Noise Ratio (SNR) for the sent pilots was very good and consequently the channel response determination was essentially noise free. The legend 'Reg PO=0 dB' means that regularization was used and the power offset between pilots and data was 0 dB, where all values of the constants $\alpha_n$ was set to the value 2. The bandwidth of each tone was 15 kHz and the carrier frequency was set to 2 GHz. No filtering in the time domain was used since the propagation channel changed too fast in time. Because the propagation channel comprised two paths, there were considerable variations in the frequency plane of the channel estimates.

As can be seen from FIG. 4, at 10% raw bit error rate, the regularized channel estimates gave a 2 dB gain compared to the non-regularized channel samples and performed 1.2 dB worse with respect to the channel estimates without any noise. The channel estimates without noise corresponds to the true propagation channel.

Embodiments of the invention have been described above with regard to an OFDM wireless communication system, i.e. the regularization is made in the frequency domain. In other embodiments of the invention, the principles of the invention presented above are used for a WCDMA wireless communication system. Thus, the regularization may also be made in the time domain. In WCDMA, pilot symbols are transmitted from a transmitter to a receiver over a pilot channel, CPICH (Common Pilot Channel). CPICH is a channel only transmitting pilot symbols. One radio frame of the CPICH comprises 15 (0, ..., 14) slots. Each slot comprises ten pilot symbols. Each pilot symbol is made up of two bits. There are two types of CPICH, the primary CPICH (P-CPICH) and the secondary CPICH (S-CPICH). They differ only in their use and the limitations placed on their physical features. For each of the P-CPICH and the S-CPICH, the set of pilot symbols are periodically repeated every frame. Thus, embodiments of the invention may be used for generating channel response determinations for at least one WCDMA pilot channel, e.g. at least one of the P-CPICH and the S-CPICH.

For WCDMA, the vector $H^{com}$ may be made up of channel estimates for pilot symbols of one slot of a radio frame. Thus, for this embodiment N=10. Consequently, the values of the vector $H^{com}$ may be based on estimations from a single slot, and previously generated channel estimates will not be needed. Once $H^{com}$ has been determined, it may be processed according to the same principles as have been described with regard to the OFDM communication system. Thus, equations (3) and (4) may be solved for $H^{com}$ comprising WCDMA pilot symbols. Thus, the minimization of equation (3) is made on the basis of a slot of the CPICH.

In some WCDMA embodiments, filtering is also provided according to equation (5).

The examples given above of ranges for $\alpha_n$ and $\lambda$ with regard to the OFDM embodiments are applicable also with regard to the WCDMA embodiments. However, other examples may apply, for example, if the regularization of the channel samples is done in time domain, such as for WCDMA, not in frequency domain as shown in equation (3), then $\alpha_n$ should be made small for large Doppler frequencies and vice versa.

Figure 5:
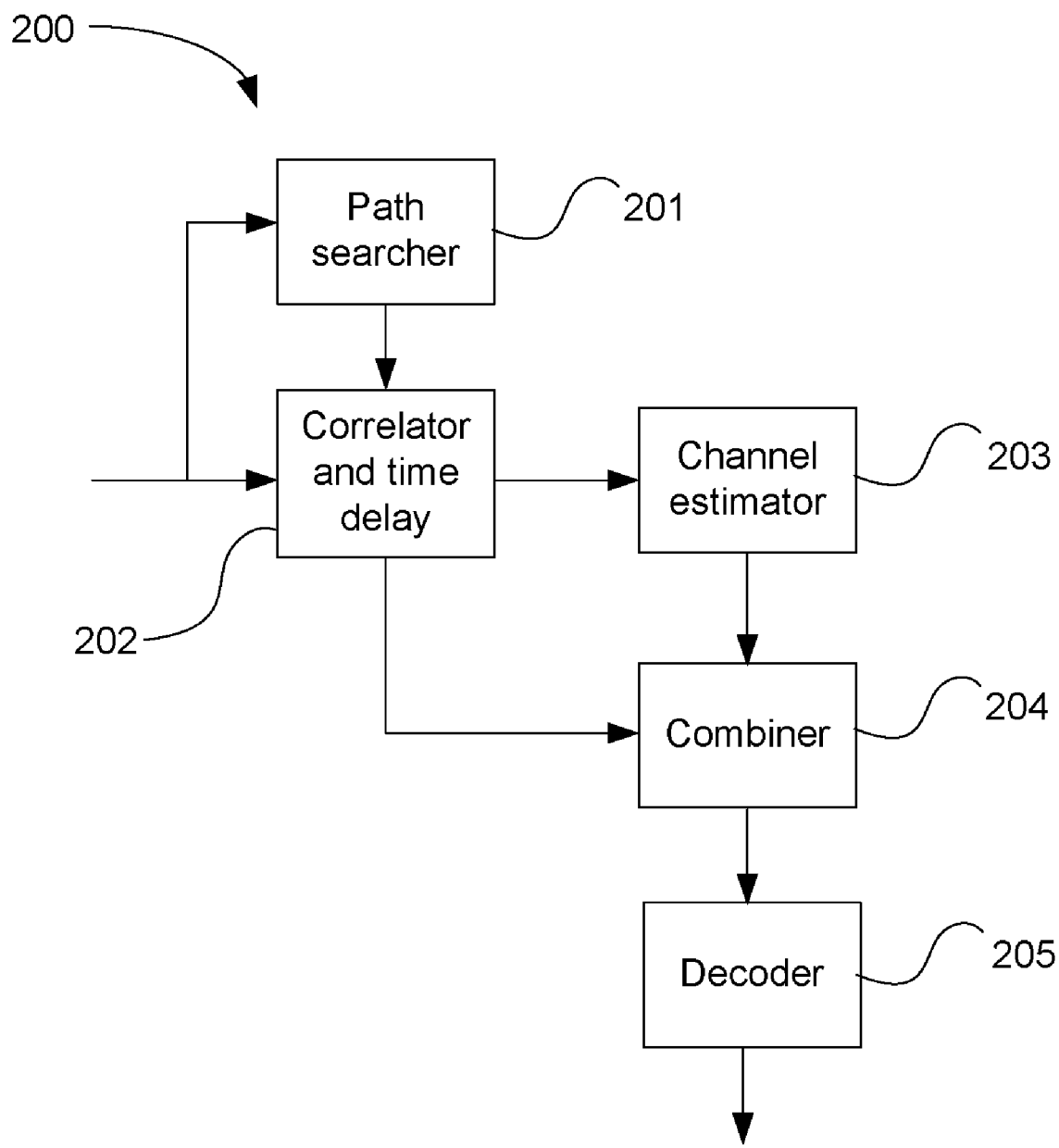
FIG. 5 is a block diagram of a WCDMA receiver.

FIG. 5 illustrates some components of a WCDMA receiver 200 comprising a channel estimator for estimating the pilot channel. In the embodiment of FIG. 5, the WCDMA receiver 200 comprises a path searcher 201, a correlation and time delay block 202, a channel estimator 203, a combiner 204, and a decoder 205. Received spread data are input to the path searcher 201 and to the correlation and time delay block 202. The correlation and time delay block 202 may comprise a plurality of fingers for the multipath channels. In each finger, the received signal, i.e. the spread data, is correlated by a spreading code, which is time aligned with the propagation time delays of the multipath signals. The propagation time delays are estimated by the path searcher 201. From the correlation and time delay block 202, pilot symbols are provided to the channel estimator 203 and data symbols are provided to the combiner 204. The output of each finger is supplied to the channel estimator and the combiner 204. The combiner 204 combines the signals and provides despread symbols based on the input from the correlation and time delay block 202 and the channel estimator 203. Then, the despread symbols may be decoded by the decoder 205. The channel estimator 203 may be provided as have been described above.

A portable or handheld mobile radio communication equipment, a mobile radio terminal, a mobile telephone, a pager, a communicator, an electronic organizer, or a smartphone may comprise the OFDM receiver 10 and/or the WCDMA receiver.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method of channel response determination for a wireless communication system operating over a plurality of channels, comprising:
   generating, by a device in the wireless communication system, a first vector of channel samples from channel estimations obtained by using a training signal;
   generating, by a device in the wireless communication system, a second vector of regularized channel responses by applying to the first vector of channel samples a regularization algorithm;
   wherein a second difference between consecutive regularized channel responses of the second vector is less than a first difference between consecutive channel samples of the first vector; and
   wherein generating a second vector comprises multiplying the first vector with a third matrix, which is an inverse of a sum of an identity matrix and a fourth matrix comprising constants, which are operative to decrease the second difference between the consecutive regularized channel responses of the second vector.

2. The method of claim 1, wherein the third matrix is pre-computed for specific values of the constants.

3. The method of claim 1, wherein the regularization algorithm comprises a regularization term that comprises a difference between a first regularized channel response and a second regularized channel response, and the second regularized channel response is consecutive of the first channel response within the second vector in a frequency domain.

4. The method of claim 1, wherein the regularization algorithm comprises constants that are operative to adjust an amount by which the second differences between consecutive regularized channel responses of the second vector are decreased.

5. The method of claim 1, wherein values of the constants are set in dependence on whether the channel samples of the first vector are based on channel estimates of a single orthogonal frequency division multiplex (OFDM) symbol.

6. The method of claim 5, wherein the values of the constants are set larger if the channel samples of the first vector are based on channel estimates of different OFDM symbols than if the channel samples of the first vector are based on channel estimates of a single OFDM symbol.

7. The method of claim 1, wherein the regularization algorithm comprises a fitting term that comprises a difference between a specific regularized channel response of the second vector and a corresponding specific channel sample of the first vector.

8. The method of claim 1, wherein the first vector comprises a plurality of groups of channel samples, and the regularization algorithm is applied to each group of channel samples separately.

9. The method of claim 1, further comprising generating a filtered third vector based on a present second vector, at least one previously generated second vector, and a filter coefficient.

10. The method of claim 1, wherein the wireless communication system is an orthogonal frequency division multiplexing communication system.

11. The method of claim 1, wherein the wireless communication system is a wideband code division multiple access communication system.

12. The method of claim 1, wherein the first and second differences are obtained in the frequency domain.

13. The method of claim 1, wherein the fourth matrix is a tri-diagonal matrix of constants.

14. The method of claim 1, wherein channel estimations obtained by using a training signal are filtered in the time domain before being used for generating the first vector of channel samples.

15. A channel response determination device for a wireless communication system operating over a plurality of channels, comprising:
   a first unit adapted to generate a first vector of channel samples from channel estimations obtained by using a training signal;
   a second unit adapted to generate a second vector of regularized channel responses by applying to the first vector of channel samples a regularization algorithm,
   wherein a second difference between consecutive regularized channel responses of the second vector is less than a first difference between consecutive channel samples of the first vector; and the second unit comprises a multiplier adapted to multiply the first vector with a third matrix that is an inverse of a sum of an identity matrix and a fourth matrix comprising constants operative to decrease the second difference between the consecutive regularized channel responses of the second vector.

16. The device of claim 15, wherein the multiplier is adapted to pre-compute the third matrix for specific values of the constants.

17. The device of claim 15, wherein the regularization algorithm comprises a regularization term that comprises a difference between a first regularized channel response and a second regularized channel response; and the second regularized channel response is consecutive of the first channel response within the second vector in a frequency domain.

18. The device of claim 15, wherein the regularization algorithm comprises constants that are operative to adjust an amount by which the second differences between consecutive regularized channel responses of the second vector are decreased.

19. The device of claim 15, wherein the second unit is adapted to adjust values of the constants in dependence on whether the channel samples of the first vector are based on channel estimates of a single orthogonal frequency division multiplex (OFDM) symbol.

20. The device of claim 19, wherein the values of the constants are larger if the channel samples of the first vector are based on channel estimates of different OFDM symbols than if the channel samples of the first vector are based on channel estimates of a single OFDM symbol.

21. The device of claim 15, wherein the regularization algorithm comprises a fitting term that comprises a difference between a specific regularized channel response of the second vector and a corresponding specific channel sample of the first vector.

22. The device of claim 15, wherein the first vector comprises a plurality of groups of channel samples, and the second unit is adapted to apply the regularization algorithm to each group of channel samples separately.

23. The device of claim 15, further comprising a third unit adapted to generate a filtered third vector based on a present second vector, at least one previously generated second vector, and a filter coefficient.

24. The device of claim 15, wherein the wireless communication system is an orthogonal frequency division multiplexing communication system.

25. The device of claim 15, wherein the wireless communication system is a wideband code division multiple access communication system.

26. The device of claim 15, wherein the first and second differences are obtained in the frequency domain.

27. The device of claim 16, wherein the fourth matrix is a tri-diagonal matrix of constants.

28. A non-transitory computer-readable medium having stored thereon instructions that cause a computer executing the instructions to carry out a method of channel response determination for a wireless communication system operating over a plurality of channels, the method comprising:
generating a first vector of channel samples from channel estimations obtained by using a training signal;
generating a second vector of regularized channel responses by applying to the first vector of channel samples a regularization algorithm;
wherein a second difference between consecutive regularized channel responses of the second vector is less than a first difference between consecutive channel samples of the first vector; and
wherein generating a second vector comprises multiplying the first vector with a third matrix, which is an inverse of a sum of an identity matrix and a fourth matrix comprising constants, which are operative to decrease the second difference between the consecutive regularized channel responses of the second vector.

* * * * *

UNITED STATES PATENT AND TRADEMARK OFFICE
CERTIFICATE OF CORRECTION

PATENT NO. : 8,121,231 B2
APPLICATION NO. : 12/278379
DATED : February 21, 2012
INVENTOR(S) : Jonsson It is certified that error appears in the above-identified patent and that said Letters Patent is hereby corrected as shown below:

In Column 1, Lines 28-30, delete " $\hat{s}_n = \frac{1}{\sqrt{N}} \sum_{m=1}^{N} s_m e^{j\frac{2\pi mn}{N}}$ ".

Signed and Sealed this
Twelfth Day of March, 2013

Teresa Stanek Rea
*Acting Director of the United States Patent and Trademark Office*